United States Patent [19]

Metz et al.

[11] Patent Number: 4,544,985
[45] Date of Patent: Oct. 1, 1985

[54] LIFTING ELECTROMAGNET

[75] Inventors: Rudi Metz, Donzdorf; Herbert Scholl, Göppingen, both of Fed. Rep. of Germany

[73] Assignee: EMAG Maschinenfabrik GmbH, Salach, Fed. Rep. of Germany

[21] Appl. No.: 480,401

[22] Filed: Mar. 30, 1983

[30] Foreign Application Priority Data

Apr. 2, 1982 [DE] Fed. Rep. of Germany ....... 3212465

[51] Int. Cl.$^4$ .............................................. H01F 7/08
[52] U.S. Cl. .................................... 361/144; 336/136
[58] Field of Search .................. 361/144; 336/170, 45, 336/119, 136; 335/281, 296, 297; 338/32 H; 323/368; 308/10; 73/DIG. 3; 324/260, 251, 246, 243, 257, 256

[56] References Cited

U.S. PATENT DOCUMENTS

| 3,413,580 | 11/1968 | Gibas | 335/281 |
| 4,319,109 | 3/1982 | Bowles | 324/260 X |
| 4,324,185 | 4/1982 | Vinson | 335/302 X |
| 4,422,041 | 12/1983 | Lienau | 324/207 |
| 4,427,940 | 1/1984 | Hirama et al. | 324/243 X |

FOREIGN PATENT DOCUMENTS 2554046  6/1977  Fed. Rep. of Germany.

Primary Examiner—Reinhard J. Eisenzopf
Attorney, Agent, or Firm—Peter K. Kontler

[57] ABSTRACT

A single or composite lifting electromagnet has several cores whose poles can attract round, elongated or otherwise configured ferromagnetic objects. The cores are surrounded by and/or flank discrete sensors in the form of Hall generators or induction coils which are provided in addition to exciting coils for the cores. The sensors are disposed centrally of or mirror symmetrically around the center of the electromagnet, and the purpose of the sensors is to generate signals in response to changes of the electromagnetic field to thereby facilitate automatic guidance of the electromagnet toward an optimum position with reference to an object which is to be lifted and transported, e.g., to the treating station of a machine tool.

26 Claims, 9 Drawing Figures

LIFTING ELECTROMAGNET

CROSS-REFERENCE TO RELATED CASE

The electromagnet which is shown in FIG. 8 of the present application is similar to those disclosed in the commonly owned copending application Ser. No. 481,046 filed Mar. 31, 1983 for "Electromagnet with expandible cores for exciting coils".

BACKGROUND OF THE INVENTION

The present invention relates to apparatus for transferring objects, such as ferromagnetic workpieces, and more particularly to improvements in apparatus which employ one or more lifting electromagnets. Still more particularly, the invention relates to improvements in lifting electromagnets which can be used to supply workpieces to or remove workpieces from the treating or processing stations of machine tools or the like and which are equipped with or embody one or more sensors serving to generate signals when they move sufficiently close to or when they are approached by one or more ferromagnetic or other objects which are capable of changing the characteristics of the electromagnetic field.

German Offenlegungsschrift No. 25 54 046 discloses a lifting electromagnet wherein the exciting coil of the electromagnet simultaneously performs the function of an induction coil. A voltage is induced in the coil in response to changes of the magnetic field, and such voltage constitutes a signal which can be used to control the operation of the apparatus embodying the electromagnet. The apparatus which is disclosed in this German publication is capable of ascertaining whether or not a ferromagnetic object has entered the magnetic field; however, the coil is incapable of furnishing an indication as to the exact position of the object with reference to the electromagnet and/or vice versa.

OBJECTS AND SUMMARY OF THE INVENTION

An object of the invention is to provide a lifting electromagnet with novel and improved sensor means which can accurately pinpoint or facilitate accurate determination of the position of the electromagnet with reference to a ferromagnetic object or any other object which can influence the field of the electromagnet.

Another object of the invention is to provide a lifting electromagnet which can be designed to lift and transport regularly or oddly shaped objects, which can be used to lift and transport lightweight or heavy objects, and which can be rapidly converted from the lifting of lightweight objects to the lifting of heavier objects or vice versa.

A further object of the invention is to provide a lifting electromagnet which embodies the aforementioned features and can be used as a means for transporting and/or demagnetizing metallic workpieces or the like.

An additional object of the invention is to provide a novel system of sensors for use in a lifting electromagnet.

Still another object of the invention is to provide a lifting electromagnet whose versatility greatly exceeds that of heretofore known lifting electromagnets.

A further object of the invention is to provide the electromagnet with novel and improved cores for its exciting coils.

An additional object of the invention is to provide a lifting electromagnet whose exciting coil or coils need not perform the function of sensors.

One feature of the invention resides in the provision of a single or composite lifting or load carrying electromagnet which comprises one or more cores defining poles, exciting coil means for the cores, and sensor means for generating signals in response to influencing of the magnetic field of the electromagnet by an at least predominantly ferromagnetic object (e.g., a cylindrical, rod-like or otherwise configurated metallic workpiece which is to be delivered to the treating station of a lathe or another machine tool). The sensor means is disposed at least substantially centrally with reference to the poles of the cores. If the sensor means comprises a plurality of sensors, such sensors are preferably disposed symmetrically to one another with reference to the center of the electromagnet (e.g., the sensors can be equidistant from the center and the neighboring sensors can be equidistant from one another).

The sensor means can include a sensor which is disposed between two poles. Also, the sensor means can comprise at least one induction coil which surrounds a section of a core. If a sensor is disposed between two poles, the electromagnet can be equipped with means for varying the distance between such poles.

At least one of the cores can comprise at least two sections one of which is slidably telescoped into the other section, and the sensor means can comprise a sensor which shares the movements of the one section. The one section can be mounted in such a way that it is freely movable with reference to the other section, e.g., under the action of gravity. Alternatively, the electromagnet can comprise an electric motor, a fluid-operated motor or other suitable means for moving the one section with reference to the other section. If the exciting coil means is connected with a source of direct current, the sensor means preferably comprises one or more semiconductors, e.g., Hall generators. One or more semiconductors can be used jointly with one or more induction coils; alternatively, the sensor means can comprise one, two or more induction coils. If the sensor means comprises several discrete sensors, such discrete sensors can be connected into a suitable bridge circuit to further enhance the sensitivity of the composite sensor means.

The number of poles of the lifting electromagnet can exceed two.

The construction of the electromagnet can be such that two of its cores (these cores may constitute all of the cores of the electromagnet) include first sections which are placed at a first distance from one another and second sections which are placed at a lesser second distance from one another. A sensor is preferably placed between the second sections of the two cores.

Still further, the electromagnet can be equipped with means for supplying direct or alternating current to the exciting coil means for the cores. Such exciting coil means can comprise a plurality of parallel or nearly parallel windings which are connected in parallel for operation with alternating current and in series for operation with direct current. Still further, such electromagnet can comprise means for connecting the windings with a source of direct current while the electromagnet actually supports and/or transports an object and for connecting the windings with a source of alternating current shortly before or shortly after disengagement of the transported object from the electromagnet.

The connecting means can be constructed in such a way that it increases the amplitude of the magnetic field for a short interval of time upon switching over from operation with direct current to operation with alternating current.

If the exciting coil means is to be connected with a source of multiphase current, the total number of poles is preferably divisible by three.

The electromagnet can comprise a permanent magnet which is disposed between two cores. The exciting coil means is then preferably disposed between the two cores and the electromagnet preferably further comprises a current source for the exciting coil means, means for changing the polarity of the exciting coil means and means for regulating the strength of the current which is supplied by the source.

The poles of the electromagnet can comprise at least one pair of poles which are disposed in mutually inclined planes, e.g., in planes making an angle of 120 degrees which is highly satisfactory when the electromagnet is to pick up rod-shaped objects.

Another feature of the invention resides in the provision of a composite electromagnet which comprises a plurality of (e.g., four) discrete lifting electromagnets each having a core with a pole and an energizing coil for the core. The composite electromagnet further comprises at least one sensor, preferably several sensors which can surround the cores of the discrete electromagnets or which are disposed between the poles of the cores of neighboring discrete electromagnets. The discrete electromagnets of the composite electromagnet can be disposed one behind the other and/or one next to the other so that poles of different polarities alternate with one another (e.g., as viewed in the circumferential direction of the composite electromagnet). The plural sensors of the sensor means are preferably disposed at least substantially symmetrically with reference to the center of the composite electromagnet. The discrete electromagnets can be separated from each other by air gaps and/or by partitions (e.g., discs) which consist of nonmagnetic material. The cores of the discrete electromagnets can be connected to each other by a square, rectangular or otherwise configurated yoke, and such yoke can carry additional exciting coil means.

The novel features which are considered as characteristic of the invention are set forth in particular in the appended claims. The improved lifting electromagnet itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
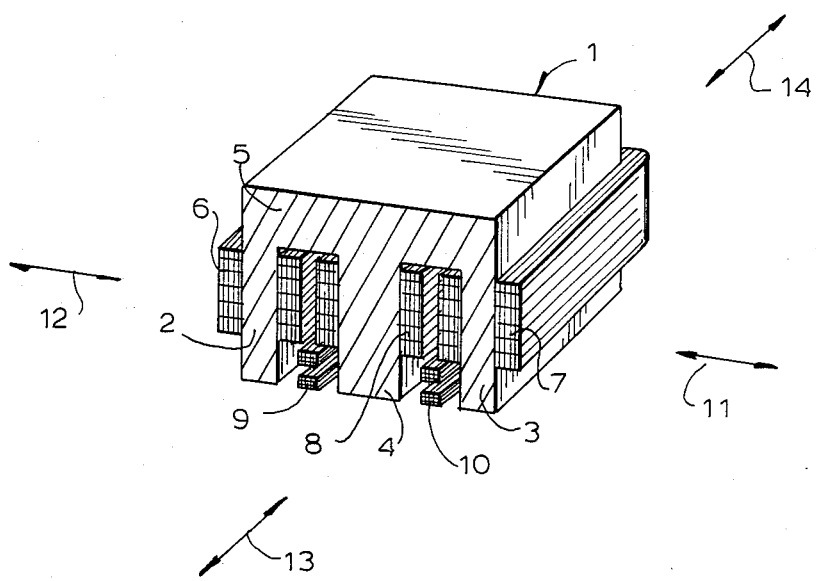
FIG. 1 is a fragmentary perspective view of a three-pole lifting electromagnet with two sensors which is constructed and assembled in accordance with a first embodiment of the invention.

FIG. 1 shows a load carrying or lifting electromagnet 1 with three elongated parallel soft iron cores 2, 3, 4 each of which has a pole and which are connected to a common yoke 5. The cores 2, 3 and 4 respectively carry exciting coils 6, 7 and 8 which are connected to a suitable energy source, not shown. The illustrated electromagnet can be operated with alternating current, direct current, alternating current superimposed upon direct current or unsmoothed direct current.

A first induction coil 9 is disposed between the cores 2, 4 and a second induction coil 10 is installed between the cores 3, 4 of the electromagnet 1. These induction coils are located in the stray magnetic flux between the respective cores. A voltage is induced in the induction coils in response to changes of the magnetic field, e.g., as a result of movement of the electromagnet 1 nearer to a ferromagnetic body and/or vice versa. Such induced voltage can be used for the purpose of controlling the movements of the electromagnet 1 to an optimum position with reference to an object which is to be attracted by the poles at the lower ends of the cores 2, 3, 4 and transported to a different locale, e.g., to an optimum position for treatment in a machine tool or the like. A change in the magnetic field will develop even if the electromagnet 1 approaches or is approached by a non-ferromagnetic body which is a metallic conductor. Thus, the presence or approach of such non-ferromagnetic body is also detected by the induction coils 9 and 10 which constitute signal generating sensors of the improved electromagnet. As will be explained in greater detail with reference to FIG. 3, the illustrated sensors 9 and 10 can be replaced with other types of sensors, e.g., by plate-like semiconductors. The selection of appropriate sensors will depend upon the nature of current which is used for the exciting coils 6, 7 and 8. Sensors in the form of semiconductors are used with preference when the exciting coils are connected to a source of direct current.

An advantage of the improved electromagnet 1 is that it employs several sensors (induction coils 9 and 10). This enables the electromagnet to allow for determination of the locus of the object which is to be picked up by the electromagnet, i.e., these sensors render it possible to ascertain whether the one or the other side of the electromagnet approaches a ferromagnetic object or any other object which is capable of inducing a voltage in the coils 9 and 10. For the sake of simplicity, it will be assumed here that the electromagnet 1 is moved with reference to the object which is to be lifted and transported; however, it is clear that the situation is analogous if the object moves with reference to the electromagnet or if the electromagnet moves with reference to a moving object.

If the electromagnet 1 of FIG. 1 is caused to move in a direction to the left, the object which is approached by the electromagnet will induce a higher voltage in the left-hand induction coil 9 and a lower voltage in the right-hand induction coil 10. Inversely, the voltage which is induced in the coil 10 will be higher than that which is induced in the coil 9 if the object is located to the right of the electromagnet 1 and the electromagnet is caused to move toward the object. The induction coils further enable a person or an automatic control circuit to ascertain whether or not the electromagnet 1 is accurately centered with reference to an object, i.e., whether or not the poles at the lower ends of the cores 2, 3 and 4 are in optimum positions to properly attract an object in such a way that the object is attracted to the core 2 with a force that matches the attraction to the core 3 and that the core 4 attracts a central portion of the object midway between the portions which are attracted to the cores 2 and 3. It will be noted that the induction coils 9 and 10 are disposed mirror symmetrically to each other with reference to the center of the electromagnet 1; such center is located midway between the longitudinal ends of the centrally disposed core 4. The voltage which is induced in the coils 9 and 10 varies if the electromagnet 1 is moved in the directions indicated by the double-headed arrows 11 and 12, namely, at right angles to the longitudinal directions of the poles at the lower ends of the cores 2, 3 and 4. If the electromagnet 1 is moved in the directions which are indicated by the double-headed arrows 13 and 14, the induction coils 9 and 10 will merely ascertain whether or not the electromagnet approaches the object. Thus, the determination whether or not the object is located centrally of the electromagnet 1 or vice versa (after the electromagnet is moved in the directions indicated by the arrows 13 and 14) is possible only by ascertaining whether or not the voltage which is induced in the coils 9 and 10 has assumed a maximum value. The induced voltage is greater if the object is located directly and exactly below the electromagnet 1, and such voltage is lower in at least one of the induction coils if the object is located laterally of the electromagnet.

The signals which are generated by the sensors of the electromagnet can be interpreted in a larger number of ways, i.e., such signals will be capable of more accurately indicating the direction of approach of the electromagnet to an object to be lifted if the induction coils or other forms of sensor means are arrayed in a more complex pattern. Thus, in lieu of placing the sensors in series one after the other (note the induction coils 9 and 10 of FIG. 1), it is possible to select a different distribution of the sensors and to use more than two sensors. For example, the sensors can be placed side-by-side rather than one behind the other.

Figure 2:
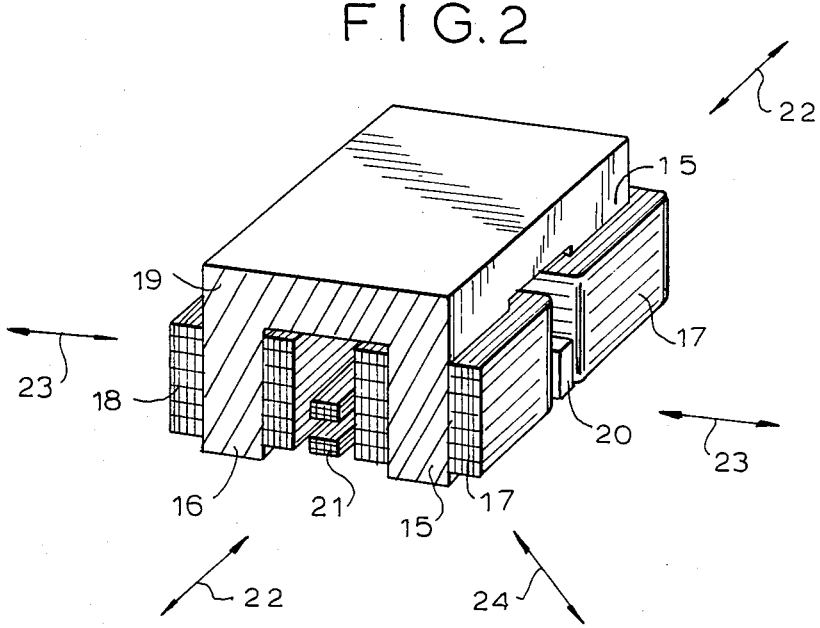
FIG. 2 is a similar fragmentary perspective view of a second electromagnet with four poles and a different system of sensors.

The just mentioned modification is shown in FIG. 2 which illustrates a modified electromagnet with four cores including a pair of cores 15 and a pair of cores 16 (only one core 16 can be seen). All of these cores extend from a common yoke 19. The cores 15 carry discrete exciting coils 17, and the cores 16 carry discrete exciting coils 18. The poles at the lower ends of all four cores may but need not be located in a common plane, and the yoke 19 may but need not have a square outline. The electromagnet of FIG. 2 comprises four sensors of which only two are actually shown. Each sensor is an induction coil. A first induction coil 20 is placed between the cores 15, a second induction coil (not shown) is placed between the cores 16, a third induction coil 21 is placed between the front cores 15, 16 and a fourth induction coil (not shown) is placed behind the rear cores 15, 16. The four induction coils are or can be disposed at the corners of a square or rectangle whose center coincides with the center of the electromagnet.

An advantage of the electromagnet which is shown in FIG. 2 is that it renders it possible to detect the position of an object with reference to the electromagnet not only in any one of the four major directions (indicated by the pairs of double-headed arrows 22 and 23) but also in a number of additional directions. For example, the voltages which are induced in the illustrated coils 20 and 21 will be higher than in the other two induction coils if the object is located in the lower right-hand corner of the sheet of FIG. 2 and the electromagnet is caused to move in one of the directions indicated by a double-headed arrow 24, namely, in a direction toward such object. The intensities of signals which are generated by the induction coils of the electromagnet shown in FIG. 2 will accurately reflect the position of the object with reference to the electromagnet and will enable a suitable control system to steer the electromagnet toward the object along the shortest route possible. The double-headed arrow 24 indicates directions of movement at an angle of 45 degrees to the directions which are indicated by the double-headed arrows 22 and 23. If one of the directions which are indicated by the arrow 24 is not the direction of movement along the shortest path between the electromagnet and the object, one of the illustrated sensors 20, 21 will furnish a signal whose intensity is greater than that of the signal which is generated by the other of these sensors. This enables the control system or the operator to change the direction of movement of the electromagnet so that the latter will rapidly reach and be properly oriented with reference to the object. It is assumed that the electromagnet of FIG. 2 has a square outline and that the four poles are located at the four corners of the square. The four induction coils are equidistant from the center of the electromagnet and from each other.

Figure 3:
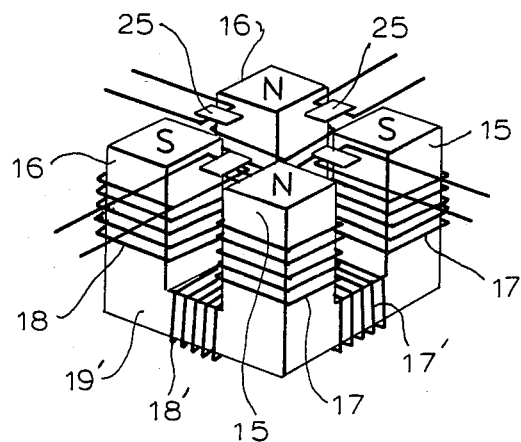
FIG. 3 is a schematic perspective of a third lifting electromagnet which constitutes a modification of the four-pole electromagnet shown in FIG. 2.

FIG. 3 shows a third electromagnet which is similar to the electromagnet of FIG. 2. The position of this electromagnet is inverted with reference to that of the electromagnet of FIG. 2, i.e., the four cores (a pair of cores 15 and a pair of cores 16) extend upwardly from a square yoke 19' whose design departs from that of the yoke 19. Each of the cores 15 is surrounded by a discrete exciting coil 17, and each of the cores 16 is surrounded by a discrete exciting coil 18 (only one coil 18 can be seen). The electromagnet of FIG. 3 comprises four additional exciting coils including two coils 17' (one between the cores 15 and the other between the cores 16) and two coils 18' (one between the front cores 15, 16 and one between the rear cores 15, 16, as viewed in FIG. 3). The yoke 19' has a centrally located opening or hole for portions of the two pairs of exciting coils 7' and 18' or discrete openings, one for each of these additional exciting coils.

The sensors of the electromagnet which is shown in FIG. 3 are plate-like semiconductors (Hall generators) 25 which are disposed between the four poles of the electromagnet and are remote from the yoke 19'. The sensors 25 are connected to a non-illustrated energy source by conductors which are shown but not referenced in FIG. 3. The characteristics of the semiconductors change in response to movement of the electromagnet relative to an object, and such changes of characteristics are indicative of the position of the object with reference to the electromagnet. The changes of characteristics entail the generation of appropriate voltage signals whose intensities are evaluated to control the movement of the electromagnet toward an optimum position with reference to the workpiece. The sensitivity of the sensor means can be enhanced by connecting the semiconductors 25 into a suitable bridge circuit. The same holds true for the sensor means including induction coils.

It will be noted that the embodiments of FIGS. 2 and 3 constitute combinations of pairs of bipolar electromagnets which are connected to one another by iron conductors. Each core of each of these electromagnets carries a discrete exciting winding, and the embodiment of FIG. 3 employs four additional exciting windings which are provided between the cores 15, 16 and are carried by the iron piece (19') which connects the cores 15, 16 to one another.

Figure 4:
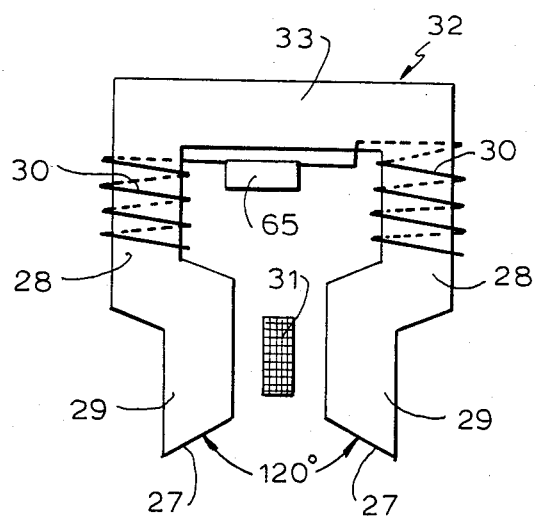
FIG. 4 is a schematic side elevational view of a fourth electromagnet which can be used for the lifting of rod-shaped objects.
Figure 5:
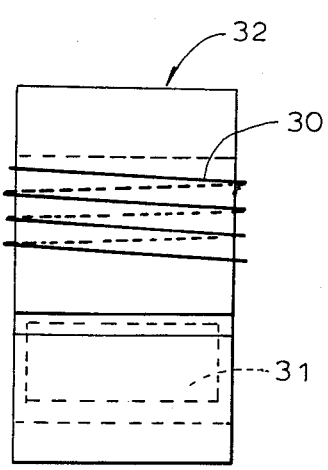
FIG. 5 is an end elevational view of the electromagnet which is shown in FIG. 4.

FIGS. 4 and 5 illustrate a further embodiment of a load carrying or lifting electromagnet 32 which can be used with particular advantage for the lifting and transport of rods or analogous objects having a circular cross-sectional outline. To this end, the poles 27 at the lower ends of the two cores 28 of this electromagnet are inclined with reference to each other; the planes of these poles preferably make an angle of 120 degrees. The cores 28 are connected to each other by a yoke 33 and carry exciting coils 30. Those sections 29 of the cores 28 which are remote from the yoke 33 and carry the poles 27 are nearer to one another than the remaining (upper) sections of these cores, and a sensor 31 (in this embodiment an induction coil) is placed between the sections 29 and extends in parallelism with the poles 27. The exciting coils 30 surround those sections of the cores 28 which are more distant from one another than the sections 29. This exhibits the advantage that the stray flux between the sections 29 of the cores 28 is more pronounced than in the absence of such design of the cores. The just discussed configuration of the cores 28 and the placing of the induction coil 31 between the sections 29 enhances the sensitivity of the sensor means because such sensor means can detect and register practically all changes of the stray flux.

It is clear that the electromagnet 32 of FIGS. 4 and 5 can be modified by using two straight parallel cores 28 and by attaching to these cores iron pieces (extensions) which occupy the positions of the sections 29 and influence the stray flux in the same way as described above for the sections 29 i.e., which reduce the distance between the two poles of the electromagnet to less than the distance between the exciting coils. The structure of FIGS. 4–5 and the just described modification of this structure share the feature that the density of stray flux per unit area is increased.

The sensor 31 of FIGS. 4 and 5 can constitute or can be replaced by a set of several suitably distributed sensors.

Figure 6:
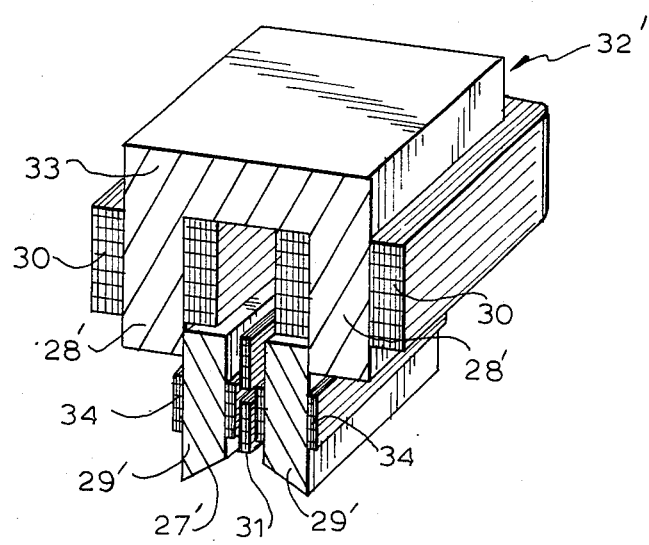
FIG. 6 is a fragmentary perspective view of a lifting electromagnet which constitutes a modification of the electromagnet of FIGS. 4 and 5.

The electromagnet 32' of FIG. 6 is a modified version of the electromagnet 32, i.e., this electromagnet employs a yoke 33 which carries two relatively short cores 28' which, in turn, carry extensions 29' corresponding to the sections 29 shown in FIGS. 4 and 5. The reference character 31' denotes one or more sensors which are disposed in the stray flux between the extensions 29' of the cores 28' and each of which can constitute one or more induction coils. Each of the extensions 29' is surrounded by an additional induction coil 34, i.e., each of the two composite cores 28', 29' of the electromagnet 32' carries an exciting coil (30) and an induction coil (34). The mutual inclination of the planes of the two poles 27' at the free ends of the extensions 29' is the same as that of the poles 27 shown in FIG. 4.

The electromagnet 32' can be said to comprise two iron cores each including a section 28' connected to the yoke 33 and a section 29' connected to the respective section 28'.

Figure 7:
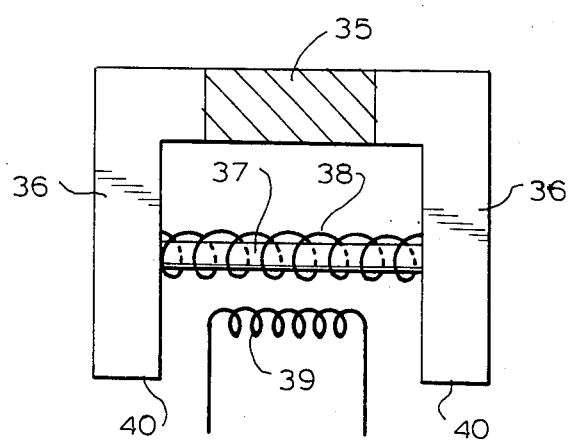
FIG. 7 is a partly end elevational and partly sectional view of a further electromagnet with a single exciting coil.

Referring to FIG. 7, there is shown a load carrying or lifting electromagnet including a permanent magnet 35 which is connected to and located between two iron pieces 36 constituting the cores of a substantially horseshoe-shaped electromagnet. The cores 36 support an iron core 37 which is parallel to the yoke including the permanent magnet 35 and is surrounded by an exciting coil 38. The strength of the current for the coil 38 is variable and the polarity of such current is reversible. In this manner, it is possible to establish an electromagnetic field which either strengthens or weakens the field of the permanent magnet 35. In fact, the exciting coil 38 can be used to demagnetize the permanent magnet 35. If the magnetic field is reinforced, the poles 40 of the structure of FIG. 7 are capable of carrying and transferring heavier loads, and the objects which have been delivered to a desired locale can be released by weakening the magnetic field. Demagnetizing of the permanent magnet 35 can entail a demagnetization of the transported objects. This can be achieved by generating an alternating magnetic field of decreasing amplitude. Moreover, the exciting coil 38 can be used to again magnetize the permanent magnet 35.

The reference character 39 of FIG. 7 denotes a sensor which constitutes an induction coil and whose function is the same as that of the previously discussed sensors. The magnetic field between the poles 40 of the cores 36 changes when the electromagnet approaches a ferromagnetic object whereby the voltage which is induced in the coil 39 represents a signal which can be evaluated and utilized in a manner as described above. The coil 39 is located centrally of the electromagnet.

Figure 8:
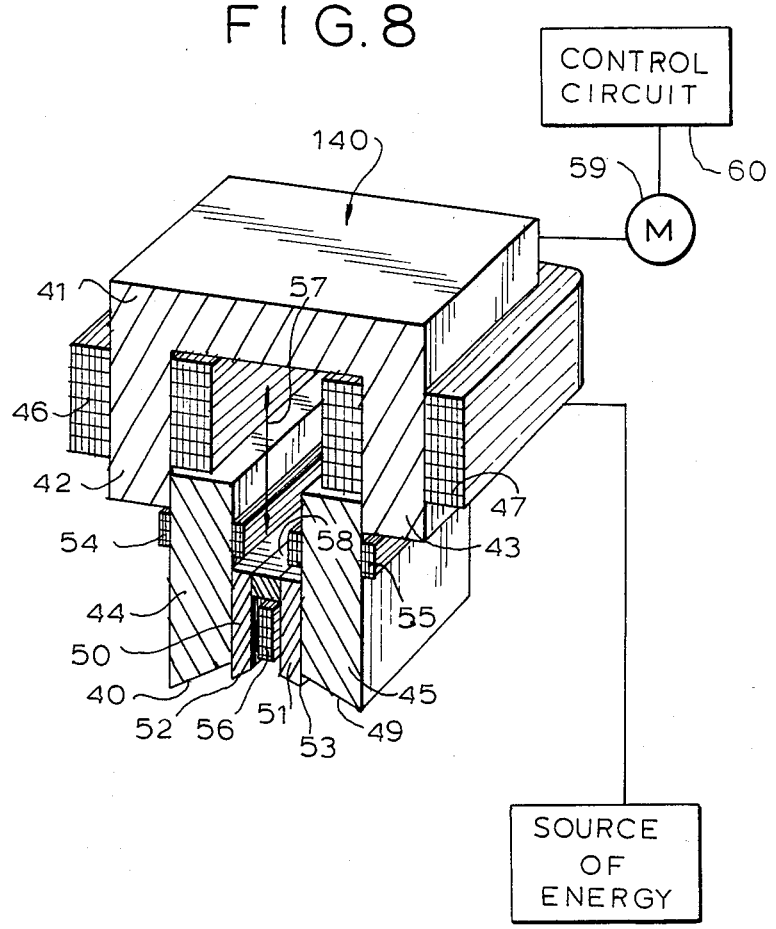
FIG. 8 is a fragmentary perspective view of still another electromagnet which constitutes an additional modification of the electromagnet shown in FIGS. 4 and 5.

Referring to FIG. 8, there is shown an electromagnet 140 having a yoke 41 which connects two parallel spaced-apart cores 42 and 43 respectively carrying exciting coils 46 and 47. The cores 42, 43 respectively support extensions 44 and 45 which are nearer to one another than the cores and have mutually inclined poles 48, 49 remote from the yoke 41. The extensions 44 and 45 respectively carry induction coils 54 and 55. To the just described extent, the electromagnet 140 is similar or analogous to the electromagnet 32' of FIG. 6 and to the electromagnet 32 of FIGS. 4 and 5 (except that the sections 29 of the electromagnet 32 do not carry induction coils). However, the sensitivity of the sensor means used in the electromagnet 140 of FIG. 8 is increased still further in that this magnet comprises two additional extensions 50, 51 which are disposed between the extensions 44, 45 and have poles 52, 53 whose mutual inclination preferably matches that of the poles 48, 49. The angle between the planes of the poles 48, 49 or 52, 53 can equal or approximate 120 degrees.

The additional extensions 50, 51 are connected to each other by a yoke 58 and are movable between the extensions 44, 45 in directions indicated by a double-headed arrow 57. This renders it possible to move the poles 52, 53 into the planes of the neighboring poles 48, 49, to move the poles 52, 53 inwardly of the planes of the poles 48, 49 or to shift the poles 52, 53 outwardly so that only these poles attract a rod-like or analogous workpiece (not shown). The arrangement is preferably such that, when the additional extensions 50, 51 are fully retracted into the space between the extensions 44 and 45, the planes of the poles 52, 53 respectively coincide with the planes of the poles 48, 49, i.e., the electromagnet 140 then exhibits two relatively large composite poles which can attract a heavy object and safely transfer such object to a selected location. For example, such composite poles can attract large-diameter ferromagnetic rods or like objects. If the electromagnet 140 is to lift smaller-diameter rods, the additional extensions 50, 51 are moved downwardly, as viewed in FIG. 8, so that the smaller-diameter object is attracted only by the smaller poles 52 and 53. The polarity of the additional extensions 50, 51 is the same as that of the associated larger or main extensions 44 and 45. It can be said that the parts 50, 51, 58 constitute an auxiliary or additional magnet which is retractable into or adapted to be partly expelled from the larger electromagnet including the composite cores 42, 44 and 43, 45.

As mentioned above, the extensions 44 and 45 respectively carry induction coils 54 and 55 which sense the presence of an object which is being approached by the electromagnet 140 and transmit appropriate signals which can be used to control the direction of movement of the electromagnet. An additional sensor 56 (e.g., an induction coil) is installed between the additional extensions 50, 51. This coil can be replaced with a plate-like semiconductor without departing from the spirit of the invention. A semiconductor will be used with preference if the exciting coils 46, 47 are connected to a source of direct current.

The arrangement may be such that the additional or auxiliary magnet 50, 51, 58 is freely movable in the directions indicated by the arrow 57 between an upper end position and a lower end position in which the planes of the poles 52, 53 are disposed at a level below the planes of the respective poles 48, 49. If the electromagnet 140 is held in the illustrated position, the auxiliary electromagnet will tend to assume its lower end position by gravity. In such extended or lower end position of the auxiliary electromagnet, the sensor 56 can much more accurately ascertain any changes in the magnetic stray flux between the closely adjacent additional extensions 50, 51 than the sensors 54 and 55. The distance between the extensions 50, 51 is necessarily shorter than that between the extensions 44, 45 since the extensions 52 and 53 are disposed between and are movable up and down relative to the extensions 44 and 45. The sensor 56 is more sensitive when the auxiliary magnet including the parts 50, 51 and 58 is moved to its extended or lower end position because this sensor then also detects changes in stray flux between the major poles 48, 49, (i.e., not only between the additional poles 52 and 53. Thus, voltage which is induced in the induction coil 56 is indicative of changes of the magnetic flux between the combined poles. If the sensor system of the electromagnet 140 is used to locate an object, particularly an object whose dimensions are large, the object is attracted to the poles 48 and 49 as soon as the circuit of the exciting coils 46 and 47 is completed whereby the object which adheres to the poles 46 and 47 shifts the auxiliary magnet 50, 51, 58 to or toward its upper end position. It does not matter that, at such time, the induction coil 56 cannot generate signals with utmost accuracy because the object is already suspended on the lifting electromagnet.

The exact manner in which the improved lifting electromagnet is mounted on a crane or in any other suitable and conventional way so that it can be moved toward a selected workpiece and that it can transfer the suspended workpiece to a desired locale forms no part of the present invention. By way of example, the improved lifting electromagnet can be suspended on the cable of a crane or it can be used in the feeding system for a machine tool to deliver workpieces to or to remove workpieces from the treating station or to deliver workpieces to a system of conveyors which in turn deliver successive workpieces to the treating station.

The electromagnet 140 of FIG. 8 can be said to comprise two composite cores each of which connects an exciting coil (46 or 47) with the respective pole (48, 52 or 49, 53). One of these cores includes a first section 42 which is rigid with the yoke 41, a second section 44 which is rigid with the section 42, and a third section 50 which is movable up and down with reference to the second section 44. The second core comprises a first section 43 which is rigid with the yoke 41, a second section 45 which is connected with the section 43, and a third section 51 which is movable up and down with reference to the second section 45. The sections 50, 51 are at least partially telescoped between the sections 44, 45.

At least some components of the sensor means in or on the improved electromagnet are or can be disposed centrally of the electromagnet, and all or some of such components can be disposed symmetrically to one another with reference to the center of the electromagnet. For example, the sensors 9 and 10 of FIG. 1 can be said to be located centrally of the electromagnet as well as that they are symmetrical to one another with reference to the center of the electromagnet. The four sensors 20 and 21 of the electromagnet shown in FIG. 2 are evidently symmetrical to one another with reference to the center of the electromagnet. The same holds true for the electromagnet of FIG. 3. The sensor 31 of FIGS. 4 and 5 is located centrally of the respective electromagnet. In FIG. 6, the sensors 34 are mirror symmetrical to one another with reference to the center of the electromagnet 32', and the sensor 31 is located centrally of this electromagnet. The coil 39 of FIG. 7 is located centrally between the cores 36. In FIG. 8, the distribution of sensors is analogous to that of the sensors which are shown in FIG. 6. If the electromagnet comprises a single sensor, the sensor is preferably located centrally of the electromagnet. On the other hand, if the number of sensors is two or more, they are preferably distributed mirror symmetrically to each other about the center of the electromagnet. Also, and as clearly shown in the drawing, the sensors can be disposed between the poles of the electromagnet (in FIG. 1, the sensor 9 is located between the poles of the cores 2, 4 and the sensor 10 is located between the poles of the cores 3, 4), or the sensors can surround the cores of the electromagnet (note the coils 34 of FIG. 6).

As used herein, the term sensor is intended to denote all such devices which change their physical characteristics in response to changes of the magnetic field. The changes should be sufficiently pronounced and/or of such nature that they can be measured and the results of measurements utilized to control the operation of the apparatus which embodies one or more lifting electromagnets.

An advantage of the improved electromagnet is that its sensor or sensors need not simultaneously constitute exciting coils. This renders it possible to locate the sensor or sensors in such a way that they can immediately respond to all or practically all changes of the magnetic field and that they can be installed at locations where they are most likely to detect such changes and generate readily detectable signals which are indicative of the detected changes. Moreover, and as explained above, proper distribution of two or more sensors in or on the improved lifting electromagnet renders it possible to utilize their signals as a means for effecting accurate directional control for movement of the electromagnet with reference to an object which consists (at least in part) of ferromagnetic materials or is otherwise capable of influencing the magnetic field when it is approached by and/or when it approaches the electromagnet. As mentioned above, this can be readily achieved by resorting to several sensors which are properly distributed around the center of the electromagnet (note particularly FIGS. 2 and 3). Such distribution of the sensors allows for the generation of signals which indicate whether a portion of or the entire electromagnet is located above the object as well as whether the electromagnet is moved along the shortest path toward a position of full or requisite overlap with the object.

For example, the improved electromagnet can be moved to a position above an elongated rod-shaped workpiece. The means for moving the electromagnet can comprise a suitable motor 59 (see FIG. 8) which can constitute a reversible electric motor, a pneumatic motor, a hydraulic motor or a hydropneumatic motor. This motor can receive signals from a suitable control circuit 60 which can include or is connected with the sensors 54–56 and operates the motor in accordance with a preselected program. Thus, once the control circuit 60 has ascertained that the electromagnet 140 is located at a level above one end portion of an elongated rod-shaped workpiece, the circuit causes the motor 59 to advance the electromagnet through a distance which is necessary to ensure that the electromagnet will come to a halt when it is located midway between the ends of the workpiece. All that is necessary is to supply the control circuit 60 with information pertaining to the length of the workpiece which is to be picked up and transported by the electromagnet 140. Adherence of the central portion of an elongated workpiece to the poles 52, 53 or to the poles 48, 49, 52 and 53 of the electromagnet 140 is advisable and advantageous on several grounds, especially as concerns the reliability of retention of the workpiece by the electromagnet. Thus, a workpiece whose center is attracted by the electromagnet is not likely to pivot and to thereby become disengaged from the poles of the electromagnet. Moreover, improper attachment of an elongated workpiece to the electromagnet can interrupt the operation of a lathe, milling machine or another machine tool which receives workpieces from the improved electromagnet. The structure of FIG. 8 (i.e., an electromagnet which is equipped with means for automatically moving it to an optimum position with reference to successive workpieces) is ideally suited for use in the work feeding systems of machine tools or the like. The electromagnet can further comprise or can be associated with discrete means for demagnetizing the workpieces during treatment; such demagnetizing can be carried out in a predictable manner only or particularly if the position of the electromagnet with reference to a workpiece can be selected with a very high degree of accuracy, i.e., it is desirable and advantageous to ensure that the spatial relationship of the workpiece relative to the electromagnet and/or vice versa can be ascertained automatically and with a very high degree of accuracy. The improved electromagnet with its sensor means is ideally suited for such operations.

The electromagnet 140 can vary the sensitivity of its sensor means by changing the distance between the poles and the sensor means. Thus, when the auxiliary magnet including the parts 50, 51, 58 is lifted, the distance between the poles 52, 53 and the induction coils 54, 55 is less than when the auxiliary magnet is allowed to assume its lower end position under the action of gravity. By varying the distance between the poles and the sensor means (either by moving the poles with reference to one or more sensors or vice versa), one can change the ratio of stray flux to useful flux. As mentioned above, a sensor which is disposed between two closely adjacent poles is more sensitive than a sensor which is placed between poles whose mutual spacing is greater. More particularly, a sensor which is placed between two closely adjacent poles will be more sensitive to changes of the magnetic field than a sensor which is placed between two distant poles. In the embodiment of FIG. 8, the induction coils 54, 55 are less likely to respond to each and every change of the magnetic field than the induction coil 56 which latter is located between two closely adjacent poles 52, 53, i.e., between two closely adjacent core sections 50, 51 which are slidably telescoped between the stationary core sections or extensions 44, 45. The induction coil 56 shares all movements of the auxiliary magnet 50, 51, 58 in directions which are indicated by the double-headed arrow 57.

It is clear that, under certain circumstances, it suffices to use a single multi-section core with a single movable section. The selection of the number of cores with movable sections will depend upon the dimensions and configuration of workpieces or other types of objects which are to be lifted, retained and transported by the improved electromagnet.

By using an electromagnet (140) with a movable auxiliary electromagnet wherein a sensor (56) is placed between two closely adjacent poles (48, 49) which are preferably located in mutually inclined planes, it is possible to position the center of the electromagnet relative to an object with a much higher degree of accuracy than heretofore. This is due to the fact that the coil 56 ascertains changes of the magnetic field between two closely adjacent sections (50, 51) of the two composite cores.

If the auxiliary magnet of FIG. 8 is replaced with two auxiliary magnets which are movable relative to one another in parallelism with the yoke 41 (as disclosed in FIG. 2 of the aforementioned commonly owned copending patent application Ser. No. 481,046), the thus modified electromagnet is ideally suited for proper lifting and transfer of elongated large-diameter or small-diameter workpieces. All that is necessary is to place a sensor (e.g., an induction coil) between the movable sections of each auxiliary magnet and to equip the electromagnet with suitable moving means which can shift the two auxiliary magnets toward or away from each other so that the auxiliary electromagnets attract two distant portions of an elongated workpiece (e.g., a rod) and that such auxiliary electromagnets attract two closely or relatively closely adjacent portions of a relatively short workpiece. If the extent to which the two auxiliary magnets in such a modified electromagnet are movable relative to one another exceeds the length of a workpiece which is to be lifted, the means for moving the auxiliary magnets need not embody any programming means because the auxiliary magnets can readily engage the end portions of the workpiece in the following way: The electromagnet is moved to a position in which one of the auxiliary magnets engages the first end portion of the workpiece, and the other auxiliary magnet is then moved away from the one auxiliary magnet until it engages or attracts the second end portion of the workpiece. The system of sensors on such electromagnet can furnish quite accurate indications as to when the one auxiliary magnet engages the first end portion and the other auxiliary magnet engages the second end portion of the workpiece. In addition, the poles 48, 49 of the second sections 44, 45 of the cores of the electromagnet then attract the workpiece midway between its ends to thus further reduce the likelihood of tilting and unintentional disengagement of the workpiece from the electromagnet.

The electromagnet 140 of FIG. 8 exhibits the advantage that it need not be equipped with means for moving the auxiliary magnet 50, 51, 58 with reference to the sections 44, 45 because the auxiliary magnet can descend by gravity and normally assumes its lower end position. Thus, when the electromagnet of FIG. 8 approaches a workpiece, the auxiliary magnet dwells in the lower end position to thus ensure that the coil 56 can detect all changes of the stray flux between the poles 48, 49 with a very high degree of accuracy. If the diameter of a workpiece which is to be lifted is relatively small, the suitably inclined poles 52, 53 are capable of attracting the workpiece so that the latter need not be attracted by the larger poles 48, 49. If the diameter of the workpiece is large, such workpiece is attracted by the larger poles 48, 49 and automatically pushes the auxiliary magnet to its upper end position in which the workpiece is attracted by all four poles because the planes of the smaller poles 52, 53 then respectively coincide with the planes of the corresponding larger poles 48, 49. The aforementioned motor means for the auxiliary magnet or magnets is necessary or desirable primarily if the auxiliary magnet or magnets are movable in parallelism with the yoke, i.e., at right angles to the directions indicated by the arrow 57 of FIG. 8.

Since the exciting coils of the improved electromagnet need not perform the function of sensor means, the electromagnet of the present invention can be equipped with means 65 (see FIG. 4) for varying the strength of current which is supplied to the exciting coils (30) in such a way that the current strength is reduced during movement of the electromagnet 32 toward an optimum position with reference to a ferromagnetic object and that the current strength is increased once the electromagnet assumes such position. Thus, the current of a strength which is needed to reliably transfer a workpiece from a first to a second location is applied only after the sensor means has already enabled or assisted the electromagnet to assume an optimum position relative to the object.

The apparatus of the present invention can comprise two or more lifting electromagnets. At least one lifting electromagnet comprises two or more poles. The utilization of two or more poles is desirable and advantageous because this renders it possible to employ a plurality of sensors which can generate signals denoting the location of a ferromagnetic object with reference to the electromagnet and the direction in which the electromagnet moves or should move relative to such object or vice versa, all in a manner as described above.

The provision of several sensors is desirable and advantageous on the additional ground that a sensor which is disposed between two poles can ascertain changes in the stray flux whereas the induction coils which surround sections of the cores ascertain changes of the main (useful) flux of the electromagnet. The ratio of stray flux to useful flux can be regulated by appropriate selection of the distance between the core sections (29 in FIGS. 4–5) which flank the sensor (31) therebetween with reference to the distance between the sections (28) which carry the exciting coils (30). The same applies for the electromagnets of FIGS. 6 and 8.

In order to enable the improved electromagnet to transport a wide variety of objects under a number of different circumstances, it is advisable to construct the electromagnet in such a way that its exciting coils can be connected with a source of alternating current or with a source of direct current. To this end, at least one exciting coil includes a plurality of parallel windings which are connected in parallel when the exciting coil is connected to a source of alternating current and which are connected in series if the exciting coil is connected to a source of direct current. This renders it possible to resort to direct current during actual transport of an object and to shift to alternating current shortly before or shortly after the object is disengaged from (i.e., released by) the poles. The electromagnet then generates an electromagnetic field of decreasing amplitude. Utilization of direct current during transport of the object reduces the likelihood of excessive heating of the object since such heating takes place only if the exciting coils are connected with a source of alternating current. Moreover, the generation of a magnetic field of decreasing amplitude shortly before or shortly after disengagement of the electromagnet from the object ensures an often desirable demagnetizing of the object and/or other objects which are adjacent to the electromagnet. In order to ensure adequate demagnetizing, it is advisable to increase the amplitude of the alternatingcurrent magnetic field (with reference to the amplitude of the magnetic field which develops while the exciting coils are connected to a source of direct current) for a short interval of time after the switchover from operation with direct current to operation with alternating current. This is desirable and advantageous on the ground that the extent of penetration of the magnetic field into the object decreases with increasing frequency of the magnetic field.

In addition to resorting to alternating current or direct current, the exciting coils of the improved electromagnet can be connected with a source of alternating current superimposed upon direct current or with a source of unsmoothed direct current.

The improved electromagnet can be combined with one or more additional lifting electromagnets, and the electromagnets of such an array of two or more electromagnets of alternating polarities can be disposed one next to and/or one behind the other and can be separated from each other by air gaps and/or by discs or analogous partitions consisting of nonmagnetic material. The arrays of lifting electromagnets can be assembled into a block which embodies a requisite number of properly distributed sensors to thus ensure that it can be reliably steered toward a selected object in a manner as fully described above. The block can be used to attract large or very large objects, and it can comprise several sets of sensors or a large number of discrete sensors which are strategically distributed in or on selected portions of the block. This further enhances the ability of the composite lifting electromagnet to locate and properly approach objects which consist (at least in part) of a ferromagnetic materia or which can influence the magnetic field or fields of the lifting electromagnet(s) for other reasons. The electromagnet of FIGS. 2 or 3 can be said to constitute an array of four discrete electromagnets which are separated from one another by air gaps and which are associated with a substantial number of sensors. The yoke 19' of FIG. 3 constitutes a means for connecting the cores of the four individual electromagnets as well as a means for supporting the additional exciting coils 17', 18'. It has been found that the composite electromagnet of FIGS. 2 and 3 is particularly suited to engage and attract large objects since the distance between the alternating poles (as considered in the circumferential direction of the composite electromagnet) can be readily selected with a view to enable the electromagnet to lift relatively small, medium-sized or large or very large objects. The directional sensitivity of the array of sensors 20, 21 (FIG. 2) or 25 (FIG. 3) is very pronounced, and such electromagnet is capable of accurately ascertaining the dimensions of the object to be lifted. Such ability of the composite electromagnet which is shown in FIGS. 2 and 3 can be enhanced still further if one or more of its electromagnets are equipped with mobile auxiliary magnets which carry additional sensors. The reasons for higher sensitivity of such electromagnets are explained in connection with the electromagnet 140 of FIG. 8. The thus modified electromagnet of FIGS. 2 or 3 can readily discriminate between smaller, larger, round, elongated and/or otherwise configurated objects as well as between objects (e.g., workpieces) which are to be lifted and other objects which should be bypassed by the improved lifting electromagnet.

Figure 9:
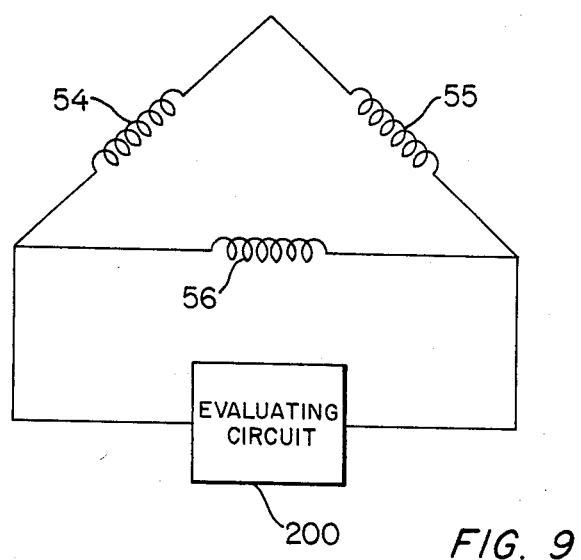
FIG. 9 is a diagram showing a bridge circuit including the sensors of the electromagnet of FIG. 8.

As mentioned above, the sensitivity of the sensor means can be enhanced by connecting the sensors into a suitable bridge circuit. This is shown in FIG. 9 wherein the bridge circuit includes the sensors 54, 55 and 56 of FIG. 8. These sensors are connected with a circuit 200 which evaluates the changes in the voltage and/or current.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A lifting electromagnet, comprising a plurality of cores defining poles arranged to attract and support at least predominantly ferromagnetic objects; exciting coil means for said cores; and sensor means for generating control signals in response to influencing of the magnetic field of the electromagnet by an at least predominantly ferromagnetic object, said sensor means being disposed at least substantially centrally with reference to the poles of said cores and comprising a plurality of discrete sensors which are symmetrical to one another with reference to the center of the electromagnet, said sensor means further comprising at least one induction coil surrounding one of said cores.

2. The electromagnet of claim 1, wherein said sensors include a sensor which is disposed between two poles.

3. The electromagnet of claim 1, further comprising means for regulating the supply of energy to said exciting coil means so that the magnetic force is less while the electromagnet is in the process of attracting an object and greater while the object adheres to the electromagnet.

4. The electromagnet of claim 1, wherein the number of said poles exceeds two.

5. The electromagnet of claim 1, further comprising means for supplying direct or alternating current to said exciting coil means.

6. The electromagnet of claim 1, wherein the total number of said poles is divisible by three and further comprising a source of multiphase current connected with said exciting coil means.

7. A composite lifting electromagnet comprising a plurality of discrete lifting electromagnets which are disposed one behind and/or one next to each other, said electromagnets having cores with poles of different polarities, exciting coil means for said cores, sensor means for generating signals in response to influencing of the electromagnetic fields of the respective electromagnets by ferromagnetic objects, said sensor means being disposed at least substantially symmetrically with reference to the center of the composite electromagnet, means for connecting the cores of said discrete electromagnets to one another and additional exciting coil means carried by said connecting means.

8. The composite electromagnet of claim 7, wherein said discrete electromagnets are separated from each other by air gaps.

9. The composite electromagnet of claim 7, wherein said discrete electromagnets are separated from one another by partitions consisting of nonmagnetic material.

10. The composite electromagnet of claim 7, wherein said sensor means comprises a plurality of discrete sensors disposed between the poles of the cores of neighboring discrete electromagnets.

11. A lifting electromagnet, comprising a plurality of cores defining poles; exciting coil means for said cores; sensor means for generating signals in response to influencing of the magnetic field of the electromagnet by an at least predominantly ferromagnetic object, said sensor means being disposed at least substantially centrally with reference to the poles of said cores and between two poles; and means for varying the distance between said poles.

12. The electromagnet of claim 11, wherein said sensor means comprises at least one induction coil.

13. A lifting electromagnet, comprising s plurality of cores defining poles, at least one of said cores comprising at least two sections one of which is movably telescoped into the other section; exciting coil means for said cores; and sensor means for generating signals in response to influencing of the magnetic field of the electromagnet by an at least predominantly ferromagnetic object, said sensor means being disposed at least substantially centrally with reference to the poles of said cores and comprising a sensor which shares the movements of said one section.

14. The electromagnet of claim 13, wherein said one section is freely movable with reference to said other section.

15. The electromagnet of claim 13, further comprising means for moving said one section with reference to said other section.

16. The electromagnet of claim 15, wherein said moving means comprises an electric motor.

17. The electromagnet of claim 15, wherein said moving means comprises a fluid-operated motor.

18. A lifting electromagnet, comprising a plurality of cores defining poles; exciting coil means for said cores; and sensor means for generating signals in response to influencing of the magnetic field of the electromagnet by an at least predominantly ferromagnetic object, said sensor means being disposed at least substantially centrally with reference to the poles of said cores and comprising a plurality of discrete sensors connected in a bridge circuit.

19. The electromagnet of claim 18, wherein said sensor means comprises at least one semiconductor.

20. A lifting electromagnet, comprising a plurality of cores, said cores including a first core and a second core, said first and second cores respectively having first sections disposed at a first distance from one another and second sections disposed at a lesser second distance from one another; exciting coil means for said cores; and sensor means for generating signals in response to influencing of the magnetic field of the electromagnet by an at least predominantly ferromagnetic object, said sensor means being disposed at least substantially centrally with reference to the poles of said cores.

21. A lifting electromagnet, comprising a plurality of cores defining poles; exciting coil means for said cores; sensor means for generating signals in response to influencing of the magnetic field of the electromagnet by an at least predominantly ferromagnetic object, said sensor means being disposed at least substantially centrally with reference to the poles of said cores; and means for supplying direct or alternating current to said exciting coil means, said exciting coil means comprising a plurality of parallel windings which are connected in parallel for operation with alternating current and in series for operation with direct current.

22. The electromagnet of claim 21, further comprising means for connecting said windings with a source of direct current while the electromagnet supports and/or transports an object and for connecting said windings with a source of alternating current shortly before or shortly after disengagement of the transported object from the poles of the electromagnet.

23. The electromagnet of claim 22, wherein said connecting means is arranged to increase the amplitude of the magnetic field for a short interval of time upon switching over from operation with direct current to operation with alternating current.

24. A lifting electromagnwt, comprising a plurality of cores; a permanent magnet disposed between said cores; exciting coil means for said cores, said exciting coil means being disposed between said cores; a current source for said exciting coil means; means for changing the polarity of said exciting coil means; means for regulating the strength of the current which is supplied by said source; and sensor means for generating signals in response to influencing of the magnetic field of the electromagnet by an at least predominantly ferromagnetic object, said sensor means being disposed at least substantially centrally with reference to the poles of said cores.

25. A lifting electromagnet, comprising a plurality of cores defining poles, said poles including at least one pair of poles disposed in mutually inclined planes; exciting coil means for said cores; and sensor means for generating signals in response to influencing of the magnetic field of the electromagnet by an at least predominantly ferromagnetic object, said sensor means being disposed at least substantially centrally with reference to the poles of said cores.

26. The electromagnet of claim 25, wherein the planes of said pair of poles make an angle which equals or approximates 120 degrees.

* * * * *